US006806316B2

(12) United States Patent
Mehta et al.

(10) Patent No.: US 6,806,316 B2
(45) Date of Patent: Oct. 19, 2004

(54) PROPYLENE POLYMERS FOR ORIENTED FILMS

(75) Inventors: Aspy Keki Mehta, Humble, TX (US); Michael Chia-Chao Chen, Houston, TX (US); Chon-Yie Lin, Houston, TX (US); James John McAlpin, Houston, TX (US); Anthony Nicholas Speca, Kingwood, TX (US); Kelly Tormaschy, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/303,448

(22) Filed: Nov. 25, 2002

(65) Prior Publication Data

US 2003/0153689 A1 Aug. 14, 2003

Related U.S. Application Data

(63) Continuation of application No. 08/916,699, filed on Aug. 22, 1997, now abandoned.
(60) Provisional application No. 60/025,398, filed on Sep. 4, 1996.

(51) Int. Cl.[7] ............................................. C08L 23/00
(52) U.S. Cl. ..................................................... 525/240
(58) Field of Search ........................................ 525/240

(56) References Cited

U.S. PATENT DOCUMENTS

| | | | |
|---|---|---|---|
| 3,937,762 A | 2/1976 | Nahmias et al. | 260/889 |
| 5,118,566 A | 6/1992 | Wilhelm et al. | 428/339 |
| 5,145,819 A | 9/1992 | Winter et al. | |
| 5,216,095 A | 6/1993 | Dolle et al. | 526/127 |
| 5,218,052 A | 6/1993 | Cohen et al. | 525/240 |
| 5,280,074 A | 1/1994 | Schreck et al. | 525/240 |
| 5,298,561 A | 3/1994 | Cecchin et al. | 525/240 |
| 5,322,902 A | 6/1994 | Schreck et al. | 525/247 |
| 5,331,054 A | 7/1994 | Fujita et al. | 525/240 |
| 5,346,925 A | 9/1994 | Sugano et al. | 521/54 |
| 5,350,817 A | 9/1994 | Winter et al. | 526/119 |
| 5,389,448 A | 2/1995 | Schirmer et al. | 428/517 |
| 5,539,056 A | 7/1996 | Yang et al. | 525/240 |
| 5,539,066 A | 7/1996 | Winter et al. | 526/119 |
| 5,548,008 A | 8/1996 | Asanuma et al. | 524/99 |
| 5,587,501 A | 12/1996 | Winter et al. | 556/53 |
| 5,700,886 A | 12/1997 | Winter et al. | 526/119 |
| 5,708,090 A | 1/1998 | Schreck et al. | 525/240 |
| 5,741,563 A | 4/1998 | Mehta et al. | 428/35.1 |
| 5,786,291 A | 7/1998 | Speca et al. | 502/104 |
| 5,891,814 A | 4/1999 | Richeson et al. | 442/401 |
| 6,143,911 A | 11/2000 | Fujita et al. | 556/11 |
| 6,207,750 B1 * | 3/2001 | Lin et al. | 525/53 |

FOREIGN PATENT DOCUMENTS

| | | | | |
|---|---|---|---|---|
| CA | 2105914 | 3/1994 | | C08F/210/00 |
| CA | 2133181 | 3/1995 | | C08F/4/76 |
| CA | 2142521 | 8/1995 | | B32B/27/32 |
| EP | 0 516 019 A2 | 12/1992 | | C08F/4/462 |
| EP | 0 310 734 B1 | 11/1994 | | C08F/4/60 |
| EP | 0 643 084 A2 | 3/1995 | | C08F/295/00 |
| EP | 0 691 366 A1 | 1/1996 | | C08J/5/18 |
| EP | 0 702 030 A1 | 3/1996 | | C08F/4/462 |
| EP | 0 704 462 A1 | 4/1996 | | C08F/10/06 |
| EP | 704463 A1 * | 4/1996 | | C08F/10/06 |
| EP | 0 905 173 A1 | 3/1999 | | C08J/5/18 |
| EP | 0 704 463 B1 | 7/1999 | | C08F/10/06 |
| WO | WO 98/10016 | 3/1998 | | C08L/23/10 |
| WO | WO 98/59002 | 12/1998 | | C08L/23/16 |
| WO | WO 99/58587 | 11/1999 | | C08F/110/06 |
| WO | WO 01/58970 | 8/2001 | | C08F/297/08 |

OTHER PUBLICATIONS

A.K. Mehta et al. in 2 Metallocene–Based Polyolefins 463–488 (J. Scheirs & W. Kaminsky eds., John Wiley & Sons 2000), New York.
Abstract for EP 0 516 019 A2—Dec. 2, 1992.
Abstract for EP 0 643 084 A2—Mar. 15, 1995.
Abstract for EP 0 702 030 A1—Mar. 20, 1996.
Olefin Polymers (Polypropylene),: R. B. Leiberman, Encyclopedia of Chem. Technology. 4th Ed., vol. 17, p. 787, (1995), New York.
"Film Applications for Metallocene–based Propylene Polymers," Mehta, et al, Metallocene–based Polyolefins, vol. 2, p. 21 (2000).
"Physical Constants Of Poly(propylene)*," R. P. Quirk, et al, Polymer Handbook, 3rd Ed., p. 27, 29, 30, 32 (1989), New York.
"Film, High Density Polyethylene," M. Bakker, et al, The Wiley Encyclopedia of Packaging Technology, p. 314 (1986), Akron, Ohio.
"Isotactic PP," E. Albizzati, et al, Polypropylene Handbook, p. 405 and 409, (1996), New York.
The Effect of Aluminium Compounds In The Copolymerization of Ethylene/α–Olefins, Katayama, et al, Macromol. Symp. p. 109–118 (1995), Chiba, Japan.

* cited by examiner

*Primary Examiner*—Bernard Lipman
(74) *Attorney, Agent, or Firm*—Paige Schmidt; Leandro Arechederra

(57) ABSTRACT

This invention relates generally to crystalline polypropylene polymers and methods for their production. Specifically, this invention relates to crystalline polypropylene polymer compositions comprising both propylene homopolymers and propylene copolymers. The compositions are prepared using metallocene catalyst systems comprising at least two metallocenes in a polymerization process that involves the sequential or parallel polymerization of propylene homopolymers and copolymers using propylene with a small amount of comonomer, preferably ethylene. The resulting polymers are excellent for use in the production of biaxially oriented films. Films prepared with these propylene polymers have a significantly broader processability range and can be evenly stretched at lower temperature compared to films prepared from traditional polypropylene polymers.

16 Claims, 6 Drawing Sheets

GPC Molecular Weight Distributions*

*GPC plots are of Relative Area versus Molecular Weight. Recoverable Compliance numbers track the high end of the distribution and are in units of $Pa^{-1} \times 10^{-4}$. Compliance is measured at about 200°C per Exxon test method.

GPC Molecular Weight Distributions*

*GPC plots are of Relative Area versus Molecular Weight. Recoverable Compliance numbers track the high end of the distribution and are in units of $Pa^{-1} \times 10^{-4}$. Compliance is measured at about 200°C per Exxon test method.

DSC Melting Distributions*

Sample 2A

Sample 4

Sample 6

\* Second melting traces, measured on Perkin Elmer DSC 7 Differential Scanning Calorimeter.

Figure 4
Processing Window During Biaxial Stretching*
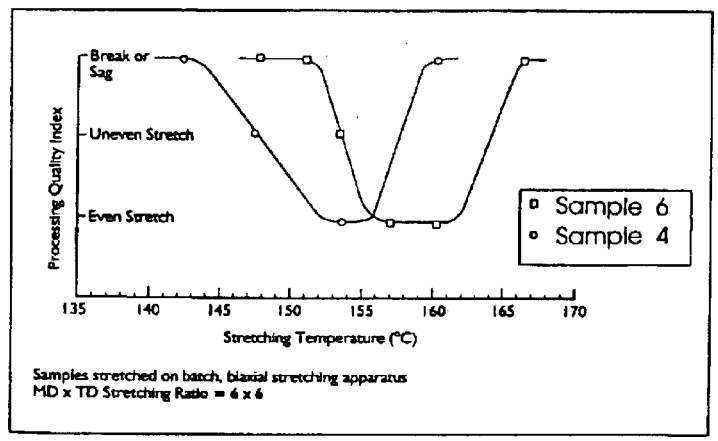
Figure 4A
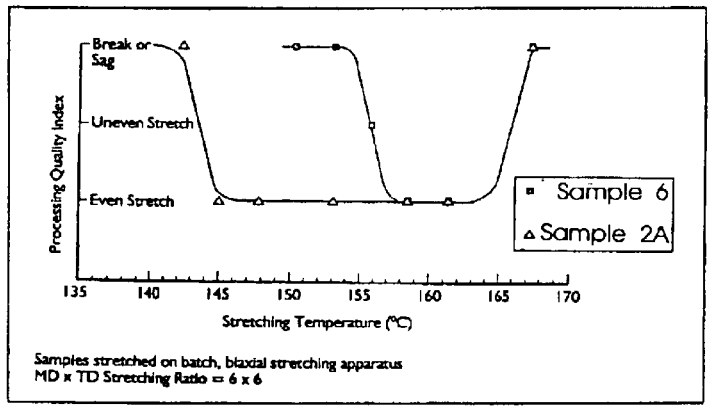
Figure 4B
*Biaxial Stretching on TM Long Stretching machine.
Conditions shown in Table 2.

Processability of Samples 2B and 9

PROPYLENE POLYMERS FOR ORIENTED FILMS

CROSS REFERENCE TO RELATED APPLICATIONS

This application is a continuation of U.S. Ser. No. 08/916,699, filed Aug. 22, 1997, now abandoned, which claims priority to Provisional Ser. No. 60/025,398, filed Sep. 4, 1996, the disclosures of which are incorporated by reference.

FIELD OF THE INVENTION

This invention relates generally to crystalline propylene polymer compositions, to methods for their production and to methods for their use in oriented film applications. Specifically, this invention relates to crystalline propylene polymer compositions comprising both propylene homopolymer and propylene copolymer components. Preferably the propylene polymer composition is isotactic. The compositions are prepared using metallocene catalyst systems comprising at least two metallocenes in a polymerization process that involves the sequential or parallel polymerization of propylene homopolymer and copolymer using propylene with a small amount of comonomer, preferably ethylene. The resulting polymer compositions are excellent for use in the production of oriented films. Films prepared with these propylene polymers have a significantly broader processability range and can be evenly stretched at lower temperature compared to films prepared from traditional propylene-based polymers.

BACKGROUND

Oriented polypropylene films are widely used in tape applications and in packaging applications such as food packaging. The optimization of processing characteristics and film properties of propylene based films has been the subject of intense effort. U.S. Pat. No. 5,118,566, for example, describes a biaxially oriented film made from polypropylene, a natural or synthetic resin, and a nucleating agent. The process for producing this film includes biaxially drawing the film at temperatures below the melting point of the polypropylene.

The present inventors have discovered crystalline propylene polymer compositions made by polymerizing propylene in one stage and then propylene and a minor amount of comonomer in a separate stage using a metallocene catalyst system comprising at least two metallocenes in each of the stages. The resulting polymers have surprisingly high molecular weight and broad molecular weight distribution, and offer processability benefits in oriented film applications. Films made from these unique polymers have a significantly broader processability range and can be evenly stretched at lower temperatures compared to the polypropylene films available today. The resulting films have a favorable balance of properties including high strength, good optical properties and good barrier properties.

Multiple stage polymerization processes are known in the art as is the use of multiple metallocenes, however, multiple stage polymerization processes are usually used to prepare block copolymers which contain rubbery materials as opposed to the crystalline polymers of this invention. U.S. Pat. Nos. 5,280,074; 5,322,902; and 5,346,925, for example, describe two-stage processes for producing propylene block copolymers. The propylene/ethylene copolymer portion of these compositions is a non-crystalline, rubbery material suitable for molding applications rather than films. U.S. Pat. No. 5,350,817 and Canadian Patent Application No. 2,133,181 describe the use of two or more metallocenes for the preparation of isotactic propylene polymers, however, neither reference describes a multiple stage process for the production of crystalline polymer compositions such as those described herein.

SUMMARY

In one embodiment, the present invention provides for crystalline propylene polymer composition comprising:

(a) from 10 to 90 weight percent of a crystalline propylene homopolymer composition comprising a first propylene homopolymer and a second propylene homopolymer; and (b) from 90 to 10 weight percent of a crystalline propylene copolymer composition comprising a first propylene copolymer and a second propylene copolymer, the first propylene copolymer and second propylene copolymer comprising from 0.05 to 15 weight percent (based on the total weight of the crystalline propylene polymer composition) of a comonomer;

wherein the crystalline propylene polymer composition has a molecular weight distribution (Mw/Mn) in the range of from 2.1 to 10; and wherein the propylene homopolymer composition and the propylene copolymer composition are obtained in separate stages using a single metallocene catalyst system comprising two different metallocene catalyst components.

In another embodiment, the two different metallocenes catalyst components are represented by the formula:

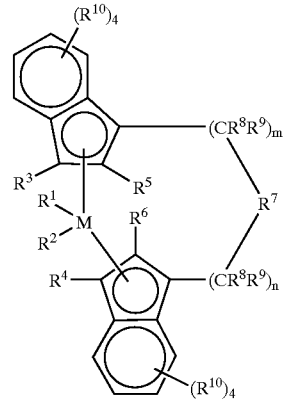

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —NR$_2^{15}$, —SR$^{15}$, —OR$^{15}$, —OSiR$_3^{15}$ or —PR$_2^{15}$ radical, wherein R$^{15}$ is one of a halogen atom, a C$_1$–C$_{10}$ alkyl group, or a C$_6$–C$_{10}$ aryl group;

R$^7$ is

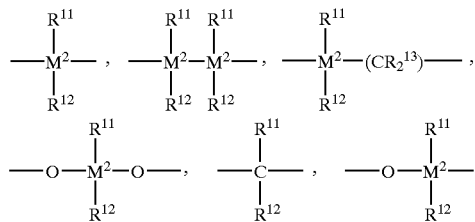

—B(R$^{11}$)—, $^-$Al(R$^{11}$)—, —Ge—, —Sn—, —O—, —S—, —SO—, —SO$_2$—, —N(R$^{11}$)—, —CO—, —P(R$^{11}$)—, or —P(O)(R$^{11}$)—;

wherein:

R$^{11}$, R$^{12}$ and R$^{13}$ are identical or different and are a hydrogen atom, a halogen atom, a C$_1$–C$_{20}$ alkyl group, a C$_1$–C$_{20}$ fluoroalkyl group, a C$_6$–C$_{30}$ aryl group, a C$_6$–C$_{30}$ fluoroaryl group, a C$_1$–C$_{20}$ alkoxy group, a C$_2$–C$_{20}$ alkenyl group, a C$_7$–C$_{40}$ arylalkyl group, a C$_8$–C$_{40}$ arylalkenyl group, a C$_7$–C$_{40}$ alkylaryl group, or R$^{11}$ and R$^{12}$, or R$^{11}$ and R$^{13}$, together with the atoms binding them, can form ring systems;

M$^2$ is silicon, germanium or tin;

R$^8$ and R$^9$ are identical or different and have the meanings stated for R$^{11}$;

m and n are identical or different and are zero, 1 or 2, m plus n being zero, 1 or 2; and the radicals R$^{10}$ are identical or different and have the meanings stated for R$^{11}$, R$^{12}$ and R$^{13}$ and two adjacent R$^{10}$ radicals can be joined together to form a ring system.

In yet another embodiment, the invention provides for a crystalline propylene polymer composition comprising:

(a) from 10 to 90 weight percent of a isotactic crystalline propylene homopolymer composition comprising a first propylene homopolymer and a second propylene homopolymer, the isotactic crystalline propylene homopolymer composition having a molecular weight distribution of less than 3.0; and (b) from 90 to 10 weight percent of a crystalline propylene copolymer composition comprising a first propylene copolymer and a second propylene copolymer, the first propylene copolymer and second propylene copolymer comprising from 0.05 to 15 weight percent (based on the total weight of the crystalline propylene polymer composition) of a comonomer, the crystalline propylene copolymer composition having a molecular weight distribution of less than 3.0;

wherein the crystalline propylene polymer composition has a molecular weight distribution (Mw/Mn) in the range of from 2.1 to 10; and wherein the isotactic crystalline propylene homopolymer composition and crystalline propylene copolymer composition are obtained in separate stages using a single metallocene catalyst system comprising two different metallocene catalyst components.

In another embodiment, the invention provides for a process for preparing a crystalline propylene polymer composition comprising the steps of:

(a) polymerizing propylene in a first stage;

(b) copolymerizing propylene and a comonomer in a second stage; and (c) recovering the crystalline propylene polymer composition comprising from 0.05 to 15 weight percent of a comonomer (based on the total weight of the crystalline propylene polymer composition);

wherein the steps (a) and (b) are conducted in the presence of a single metallocene catalyst system comprising two different metallocene catalyst components.

The invention also provides for a film comprising a crystalline propylene polymer composition comprising:

a) from 10 to 90 weight percent of a crystalline, isotactic propylene homopolymer composition comprising a first propylene homopolymer and a second propylene homopolymer; and b) from 90 to 10 weight percent of a crystalline propylene copolymer composition comprising a first propylene copolymer and a second propylene copolymer, the first propylene copolymer and second propylene copolymer comprising from 0.05 to 15 weight percent (based on the total weight of the crystalline propylene polymer composition) of a comonomer;

wherein the crystalline propylene polymer composition is prepared using a single metallocene catalyst system comprising two different metallocene catalyst components; and wherein the crystalline propylene polymer composition has a molecular weight distribution from 2.1 to 10.

In another embodiment, the invention provides for a film comprising a crystalline propylene polymer composition comprising:

a) from 10 to 90 weight percent of a crystalline, isotactic propylene homopolymer composition comprising a first propylene homopolymer and a second propylene homopolymer, the crystalline, isotactic propylene homopolymer composition having a molecular weight distribution of less than 3; and b) from 90 to 10 weight percent of a crystalline propylene copolymer composition comprising a first propylene copolymer and a second propylene copolymer, the crystalline propylene copolymer composition having a molecular weight distribution of less than 3, the first propylene copolymer and the second propylene copolymer comprising from 0.05 to 15 weight percent (based on the total weight of the crystalline propylene polymer composition) of a comonomer;

wherein the crystalline propylene polymer composition has a molecular weight distribution in the range of from 2.1 to 10.

BRIEF DESCRIPTION OF THE FIGURES

FIGS. 4a and 4b represents a plot of processing windows during biaxial orientation of films for comparative and inventive examples.

DETAILED DESCRIPTION

Figure 1:
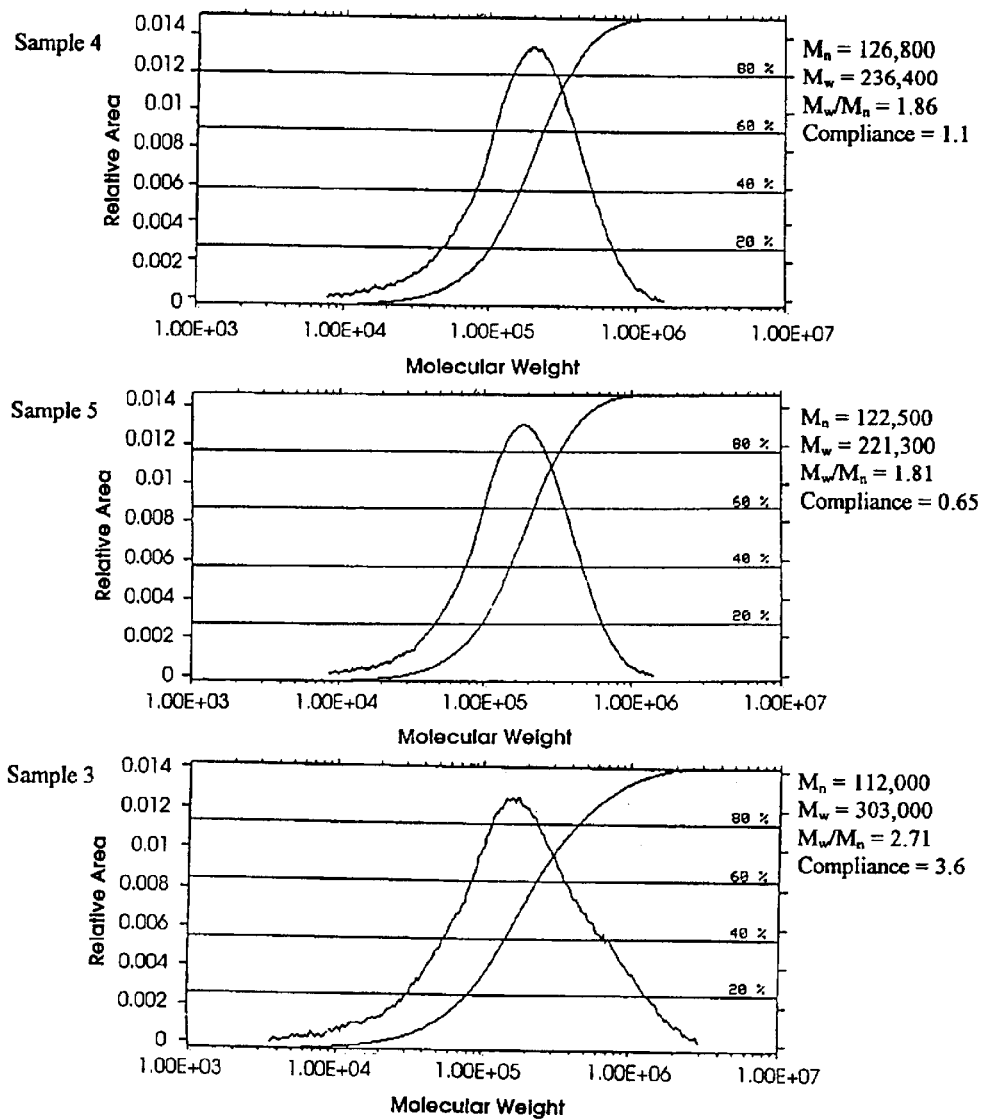
FIG. 1 and FIG. 1 (Continued) represents GPC molecular weight distributions of comparative and inventive samples.
Figure 1:
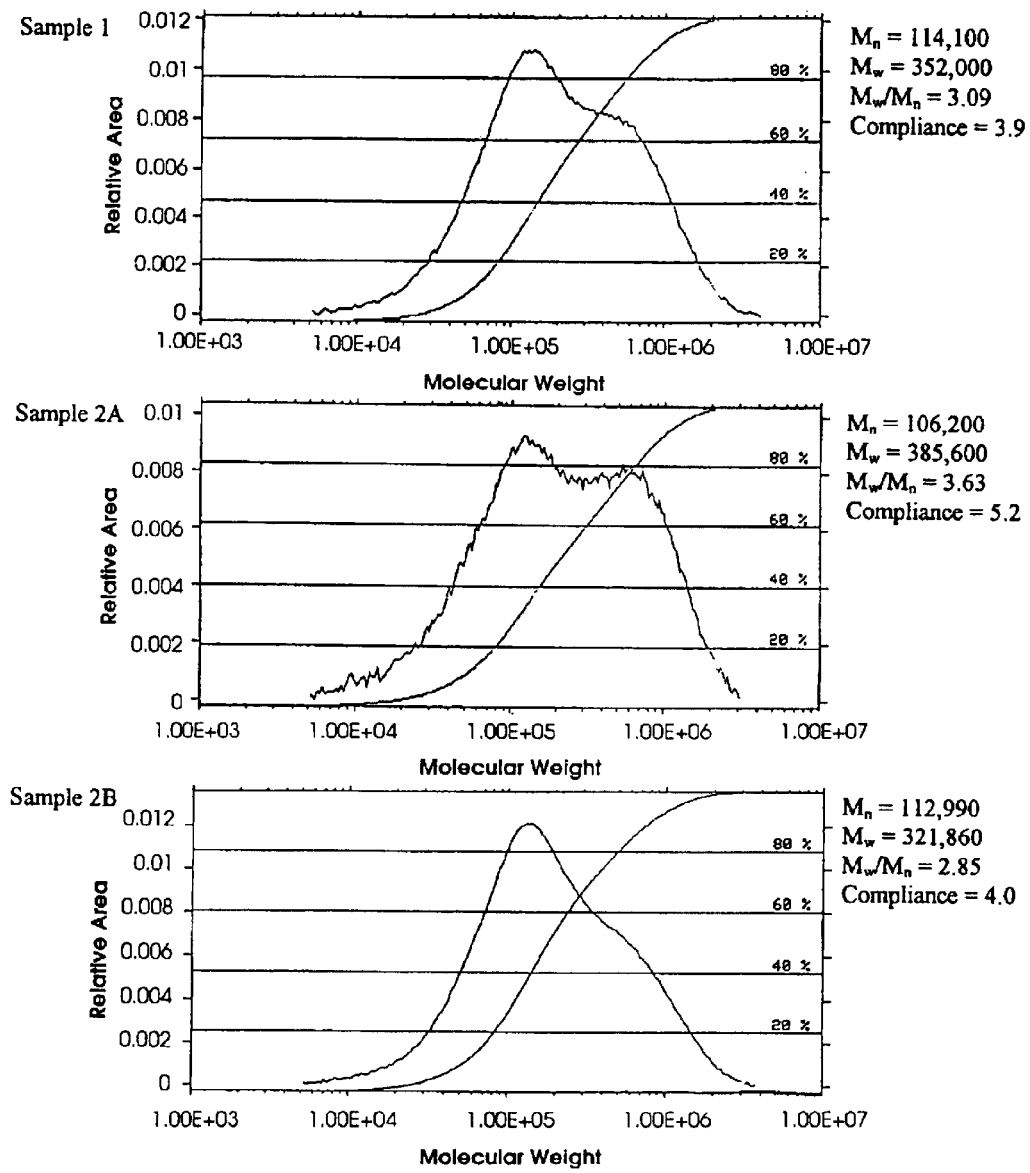

This invention relates to (1) methods for making crystalline propylene polymers; (2) the crystalline propylene polymer compositions; and (3) oriented films made from the crystalline propylene polymer compositions. These are described in turn below.

As used herein "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn).

As used herein, unless differentiated, "polymerization" includes copolymerization and terpolymerization, "monomer" includes comonomer and termonomer, and "polymer" includes copolymer and terpolymer.

Methods for Making Crystalline Propylene Polymer Compositions

The methods of this invention involve the use of metallocene catalyst systems that comprise two metallocenes and an activator. Preferably, these catalyst system components are supported on a support material.

Metallocenes

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Preferred metallocenes are those represented by the formula:

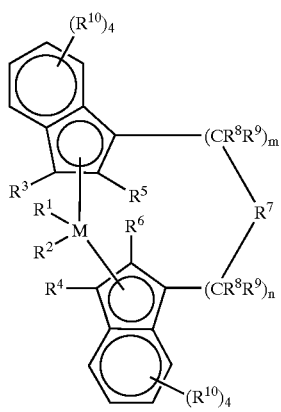

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_9$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

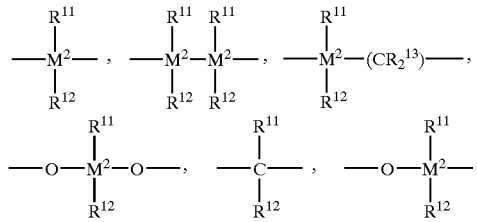

—B($R^{11}$)—, $^-$Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_9$–$C_{40}$ arylalkenyl group, preferably a $C_9$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred metallocenes are compounds of the structures (A) and (B):

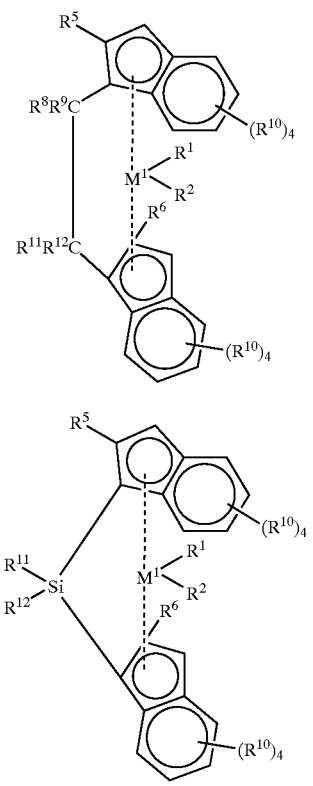

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multistep process involving repeated deprotonations/metallations of the aromatic ligands and introduction of the bridge and the central atom by their halogen derivatives. The following reaction scheme illustrates this generic approach:

$H_2R^c$ + BuylLi ⟶ $HR^cLi$ $H_2R^d$ + BuylLi ⟶ $HR^dLi$

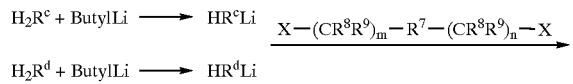

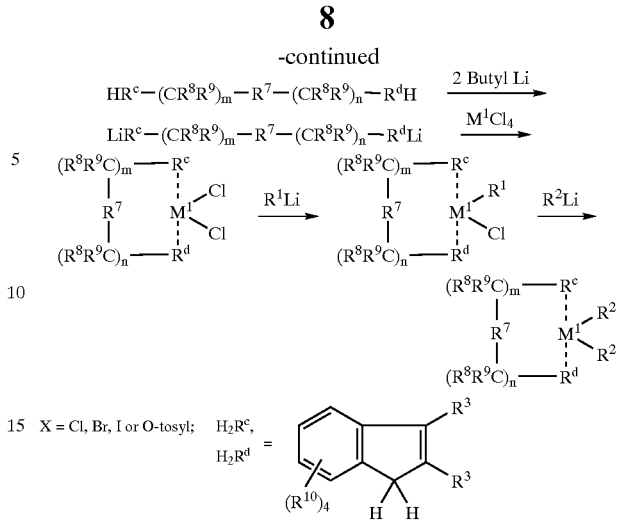

Additional methods for preparing metallocenes are fully described in the *Journal of Organometallic Chem.*, volume 288, (1985), pages 63–67, and in EP-A-320762, both of which are herein fully incorporated by reference.

Illustrative but non-limiting examples of preferred metallocenes include:

Dimethylsilandiylbis (2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl) ZrCl$_2$;
Dimethylsilandiylbis(2-ethyl-4-phenyl-1-indenyl)ZrCl$_2$;
Dimethylsilandiylbis (2-ethyl-4-naphthyl-1-indenyl)ZrCl$_2$,
Phenyl(methyl)silandiylbis(2-methyl-4-phenyl-1-indenyl) ZrCl$_2$,
Dimethylsilandiylbis(2-methyl-4-(1-naphthyl)-1-indenyl) ZrCl$_2$,
Dimethylsilandiylbis(2-methyl-4-(2-naphthyl)-1-indenyl) ZrCl$_2$,
Dimethylsilandiylbis(2-methyl-indenyl)ZrCl$_2$,
Dimethylsilandiylbis(2-methyl-4,5-diisopropyl-1-indenyl) ZrCl$_2$,
Dimethylsilandiylbis(2,4,6-trimethyl-1-indenyl)ZrCl$_2$,
Phenyl(methyl)silandiylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilandiylbis(2-methyl-4-ethyl-1-indenyl)ZrCl$_2$,
Dimethylsilandiylbis(2-methyl-4-isopropyl-1-indenyl) ZrCl$_2$,
Dimethylsilandiylbis(2-methyl-4-t-butyl-1-indenyl)ZrCl$_2$,
Phenyl(methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl) ZrCl$_2$,
Phenyl(methyl)silandiylbis(2-methyl-4,5-benzo-1-indenyl) ZrCl$_2$,
Phenyl(methyl)silandiylbis(2-methyl-4,5-(methylbenzo)-1-indenyl)ZrCl$_2$,
Phenyl(methyl)silandiylbis(2-methyl-4,5-(tetramethylbenzo)-1-indenyl)ZrCl$_2$,
Phenyl(methyl)silandiylbis (2-methyl-a-acenaphth-1-indenyl)ZrCl$_2$,
1,2-Ethandiylbis(2-methyl-4,5-benzo-1-indenyl)ZrCl$_2$, 1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(methyl)silandiylbis(2-methyl-5-isobutyl-1-indenyl) ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,145,819; 5,243,001; 5,239,022; 5,329,033; 5,296,434; 5,276,208; and 5,374,752; and EP 549 900 and 576 970 all of which are herein fully incorporated by reference.

The metallocenes preferably selected for use in this invention are two or more different metallocenes which, when used alone, produce isotactic, crystalline propylene polymer and when used in combination, produce polymer having the attributes desired for the particular film application of interest. Particularly preferred metallocenes are those selected from formulas A and/or B which when used alone to produce propylene homopolymer, are capable of producing an isotactic polymer having a weight average molecular weight of from about 25,000 to about 1,500,000 at commercially attractive temperatures of from about 50° C. to about 120° C. Preferably two or more metallocenes are selected which produce polymers having different molecular weights. This results in a broader molecular weight distribution.

The metallocenes used may show different molecular weight responses when in the presence of comonomer as will be described later in the Examples. This will also affect the molecular weight distribution of the product. For example, we have found that the incorporation of ≦1 wt % ethylene comonomer during the polymerization process as described herein results in a substantial broadening of the molecular weight distribution at the high molecular weight end. This is unexpected since with both the individual metallocenes used, the molecular weight drops with ethylene addition.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution.

Preferably the catalyst system used in the process of this invention comprises one metallocene of the formula A and/or B above that is capable of producing propylene homopolymer at polymerization temperatures of from about 50° C. to about 100° C. having a molecular weight in the range of from about 25,000 to about 300,000, preferably from about 100,000 to about 300,000. The other metallocene is preferably capable of producing propylene homopolymer at the same temperature that has a molecular weight in the range of from about 300,000 to about 1,500,000, preferably from about 300,000 to about 1,000,000. Preferably, each metallocene produces a polymer component having a molecular weight distribution of less than about 3, preferably less than about 2.5.

Thus preferably one metallocene is selected from the group consisting of rac-: dimethylsilandiylbis(2-methylindenyl)zirconium dichloride; dimethylsilandiylbis (2,4-dimethylindenyl)zirconium dichloride; dimethylsilandiylbis(2,5,6-trimethylindenyl)zirconium dichloride; dimethylsilandiylbis indenyl zirconium dichloride; dimethylsilandiylbis(4,5,6,7-tetrahydroindenyl)zirconium dichloride and dimethylsilandiylbis(2-methyl-4,5-benzoindenyl)zirconium dichloride.

Preferably the other metallocene is selected from the group consisting of rac-: dimethylsilandiylbis(2-methyl-4-phenylindenyl)zirconium dichloride; dimethylsilandiylbis (2-methyl-4,6-diisopropylindenyl)zirconium dichloride; dimethylsilandiylbis(2-methyl-4-napthylindenyl)zirconium dichloride; and dimethylsilandiylbis(2-ethyl-4-phenylindenyl)zirconium dichloride.

The ratio of metallocenes used in polymerization will depend partly on the activities of the metallocenes and on the desired contribution of each. Thus, for example, if two metallocenes are used in a 1:1 ratio and the activities of each are similar, then the polymer product will be expected to comprise about 50% of polymer produced by one metallocene and about 50% of polymer produced by the other. The breadth of the product's molecular weight distribution will depend at least partly on the difference in molecular weight capability between the metallocenes. The addition of comonomer and/or hydrogen in the polymerization process may affect the contribution of each metallocene as described in detail below.

In an alternative embodiment, a different set of metallocenes is used in each stage of polymerization.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes are preferably used as activators, most preferably methylalumoxane (MAO). Generally, the alkylalumoxanes preferred for use in olefin polymerization contain about 5 to 40 of the repeating units:

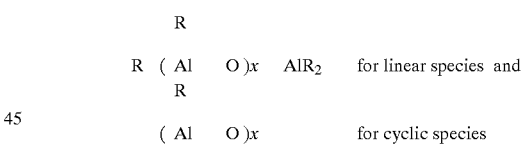

where R is a C$_1$–C$_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference. (as used herein unless otherwise stated "solution" refers to any mixture including suspensions.)

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat.

No. 5,157,137, for example, discloses a process for forming clear, gel-free solutions of alkylalumoxane by treating a solution of alkylalumoxane with an anhydrous salt and/or hydride of an alkali or alkaline earth metal.

Ionizing activators may also be used to activate metallocenes. These activators are neutral or ionic, or are compounds such as tri(n-butyl)ammonium tetrakis (pentafluorophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Support Materials

The catalyst systems used in the process of this invention are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be pre-activated separately and then combined with the support material either separately or together. If the metallocenes are separately supported, then preferably, they are dried then combined as a powder before use in polymerization.

Regardless of whether the metallocenes and their activator are separately precontacted or whether the metallocenes and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and in co-pending U.S. Ser. No. 08/248,284, filed Aug. 3, 1994 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The polymer compositions of this invention are generally prepared in a multiple stage process wherein homopolymerization and copolymerization are conducted separately in parallel or, preferably in series. In a preferred mode, propylene is homopolymerized and thereafter propylene and comonomer are copolymerized in the presence of the initially produced homopolymer using the above described metallocene catalyst systems. If, however, the copolymer is prepared first, the subsequently prepared "homopolymer" is likely to contain some traces of comonomer.

Individually, each stage may involve any process including gas, slurry or solution phase or high pressure autoclave processes. Preferably a slurry (bulk liquid propylene) polymerization process is used in each stage.

A slurry polymerization process generally uses pressures in the range of from about 1 to about 100 atmospheres (about 0.1 to about 10 MPa) or even greater and temperatures in the range of from −60° C. to about 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system, comonomer and reaction conditions. In general, propylene should be homopolymerized for a time period sufficient to yield a composition having from about 10 to about 90 weight percent homopolymer based on the total weight of the polymer, preferably from about 20 to about 80 weight percent, even more preferably from about 30 to about 70 homopolymer weight percent based on the total weight of the polymer.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. A preferred product form is to have the comonomer be present in the high molecular weight species of the total polymer composition to provide a favorable balance of good film stretchability without breaking, coupled with low extractables, low haze and good moisture barrier in the film. Accordingly in this preferred case, the same or lower levels of hydrogen are utilized during copolymerization as were used during polymerization in the second or subsequent reactor.

Polymer Compositions

The polymer compositions of this invention are a reactor blend of crystalline propylene homopolymer and copolymer. The polymer comprises from about 10 to about 90 weight percent homopolymer based on the total weight of the polymer, preferably from about 20 to about 80 weight percent, even more preferably from about 30 to about 70 weight percent homopolymer based on the total weight of the polymer.

As shown later in the Examples, a reactor blend of just crystalline propylene homopolymers made in the different polymerization stages, using a system of mixed metallocene catalysts, does provide an enhancement in film orientability and good film properties over the case of a propylene homopolymer made via a single metallocene catalyst. The homopolymer/copolymer compositions of the invention however, provide a favorable balance of broad film processability range and properties.

Any comonomer may be used to make the polymers of this invention. Preferably the comonomer is selected from the alpha-olefin group consisting of ethylene, 1-butene, 1-pentene, 1-hexene, and 1-octene. Combinations of comonomers and substituted comonomers such as 4-methylpentene-1 can also be used. The most preferred of these comonomers are ethylene, 1-pentene, and 1-hexene. Diolefins and cyclic olefins may also be used.

The amount of comonomer used will depend on the type of comonomer and desired properties. The final composition may contain any amount of comonomer as long as the components of the composition remain crystalline. In general the amount of comonomer units based on the total weight of the polymer is in the range of from about 0.05 to about 15 weight percent, preferably from about 0.1 to about 10 weight percent, even more preferably from about 0.5 to about 8 weight percent, and most preferably from about 0.5 to about 5 weight percent based on the total weight of the polymer. Conversely, the polymer comprises from about 99.95 to about 85 weight percent propylene units based on the total weight of the polymer, preferably from about 99.90 to about 90 weight percent, even more preferably from about 99.5 to about 92 weight percent, and most preferably from about 99.5 to about 95 weight percent propylene units based on the total weight of the polymer.

A desirable feature of this composition is the presence of comonomer in the high molecular weight species, to selectively reduce the crystallinity and improve film orientability at stretching temperatures, while the homopolymer, higher crystalline component provides the desirable film properties such as stiffness and barrier. The polymers of this invention also retain the low extractables levels characteristic of single-site metallocene-based polymers, which are typically under 2 weight percent, as measured by 21 CFR 177.1520 (d)(3)(ii). As will be shown later in the Examples, the polymers of this invention combine the stiffness and barrier properties of homopolypropylene with the enhanced low temperature stretchability, without breaks, of a random copolymer.

The propylene polymer compositions of this invention are particularly suitable for oriented film applications and preferably have a weight average molecular weight (MW) that is in the range of from about 140,000 to about 750,000 preferably from about 150,000 to about 500,000, and most preferably from about 200,000 to about 400,000. These polymer compositions preferably have a melt flow rate (MFR) that is in the range of from about 0.2 dg/min. to about 30 dg/min., preferably from about 0.5 dg/min. to about 20 dg/min., even more preferably from about 1 dg/min. to about 10 dg/min. The polymer compositions of this invention have a broadened molecular weight distribution as compared to polymers prepared with only one type of metallocene catalyst. Preferably the polymers have a molecular weight distribution ($M_w/M_n$) in the range of from about 2.1 to about 10.0; more preferably from about 2.5 to about 7.0.

The polymer compositions of this invention will have a tailored composition distribution reflecting their homopolymer/copolymer makeup and the presence of the component contributions from each of the metallocenes used. The copolymer species derived from each metallocene will be narrow in composition distribution, typical for single site metallocene-based polymers. The final composition distribution will depend on the level of comonomer, the ratio of homopolymer to copolymer produced and the comonomer incorporating tendencies of the individual metallocenes. The design of the molecular weight distribution, tacticity distribution, and composition distribution of the final composition depends on the requirements of the targeted end application.

The polymers of this invention can be blended with other polymers, particularly with other polyolefins. Examples of such would be blends with conventional propylene polymers.

Oriented Films

The crystalline propylene polymers of this invention exhibit exceptional film orientability and the films exhibit a good balance of properties. Any film fabrication method may be used to prepare the oriented films of this invention as long as the film is oriented at least once in at least one direction. Typically, commercially desirable oriented polypropylene films are biaxially oriented sequentially or simultaneously. The most common practice is to orient the film first longitudinally and then in the transverse direction. Two well known oriented film fabrication processes include the tenter frame process and the double bubble process.

We have found that the novel structure of the crystalline propylene compositions of this invention translates to distinct differences versus standard films made with today's Ziegler-Natta produced propylene polymers and compared with films produced with a single metallocene. As discussed in more detail below, biaxial stretching studies show that the films of this invention have a substantially broader processability range and can be evenly stretched at lower temperature. Stretching studies at elevated temperatures on cast sheets along machine direction (MD) and transverse direction (TD) indicate that the films of this invention stretch easily without breaking at lower stretching temperatures when compared to Ziegler-Natta produced propylene polymers. This indicates a capability to operate at significantly higher line speeds on commercial tenter frame lines, while still making oriented films having good clarity, stiffness and barrier properties.

The final films of this invention may generally be of any thickness, however, preferably the thickness is in the range of from about 1–200 μm, preferably 2–150 μm, and more preferably, 5 to 75 μm. There is no particular restriction with respect to draw ratio on film stretching, however, preferably the draw ratio is from about 4 to about 10 fold for monoaxially oriented films and from about 4 to about 15 fold in the transverse direction in the case of biaxially oriented films. Longitudinal (MD) and transverse stretching is preferably carried out at a temperature in the range of from about 70° C. to about 200° C., preferably from about 80° C. to about 190° C. The films may be coextruded or laminated and/or may be single or multi layered with the film of the invention comprising at least one component of the layers, typically the core layer.

Additives may be included in the film polymer compositions of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application. In addition, hydrogenated and/or petroleum hydrocarbon resins may be used as additives.

The film surfaces may be treated by any of the known methods such as corona or flame treatment. In addition standard film processing (e.g. annealing) and converting operations may be adopted to transform the film at the line into usable products.

EXAMPLES

Samples 1, 2A and 2B are propylene polymers consistent with this invention. These were compared against several metallocene-based and conventional Ziegler-Natta based propylene polymers as follows. Sample 3 was prepared from the same metallocene catalyst system (comprising two metallocenes) used to make Samples 1, 2A and 2B, but without using any comonomer. Samples 4 and 5 were prepared from a single metallocene-based catalyst; Sample 4 is a homopolymer, while Sample 5 contains ethylene as comonomer. The Ziegler-Natta produced propylene polymers are Samples 6, 7, 8 and 9. Samples 6 and 9 are polymers of controlled crystallinity, comprising a reactor blend of propylene homopolymer and propylene copolymer, similar to the invention polymers but prepared from conventional Ziegler-Natta catalyst. Product PP4792 E1 is an example of Sample 6. Product PP4782, at a slightly lower MFR (2.1 versus 2.6 for PP4792 E1) is an example of Sample 9. Samples 7 and 8 are conventional random copolymer polypropylenes. Products PP 4822 and PD 9012 E1 are examples of Samples 7 and 8 respectively. The Ziegler-Natta products above (Samples 6, 7, 8 and 9) are available commercially from Exxon Chemical Company, Houston Tex., USA. Table 1 provides characterization data describing Samples 1 to 9.

The copolymer, Sample 1, was prepared by using a catalyst system that employed an equimolar mix of two metallocenes on a silica support. The catalyst system was prepared as follows. In an inert nitrogen atmosphere, 8.0 g of rac dimethylsilanediylbis(2-methyl-4-phenylindenyl) zirconium dichloride was combined with 6.0 g of dimethylsilanediylbis(2-methyl-indenyl)zirconium dichloride and 780 g of 30 wt % methylalumoxane solution in toluene (Albemarle Corporation, Baton Rouge, La.). 860 g of toluene was added to dilute the solution. Separately 939 g MS948 silica (1.6 cc/g pore volume—available from Davison Chemical Division of W. R. Grace, Baltimore, Md.) previously dehydrated to 600° C. in a stream of flowing $N_2$ was charged to the catalyst preparation vessel. With the agitator on the metallocene-aluminoxane solution was added to the silica. After addition of the solution mixing continued for one hour and then vacuum was applied to the vessel. A slight nitrogen purge was added to the bottom of the vessel to aid in removing the volatiles. At the end of drying 1454 g of free flowing solid was obtained. Analysis showed a loading of 8.95 wt % Al and 0.17 wt % Zr with an Al/Zr molar ratio of 180.

Several batches of the catalyst system were combined to provide sufficient charge for the polymerization run. The catalyst system was oil slurried (20 parts by weight to 80 parts by weight Drakeol™ 35 available from Penreco, Dickinson, Tex.) for ease of addition to the reactor.

The procedure for polymerizing Sample 1 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 5 g/hr. Triethylaluminum (TEAL) was employed as scavenger and fed at a rate of 160 ml/hr of a 2 wt % solution of TEAL in hexane solvent. Propylene was fed at a rate of about 73 kg/hr to the first reactor and about 27.5 kg/hr to the second reactor. Ethylene comonomer was added only to the second reactor at a feed rate as needed to result in an overall incorporation of about 0.8 wt % ethylene in the final polymer. Hydrogen was added for molecular weight control at 500 mppm in the first reactor. No addition of fresh hydrogen was fed to the second reactor. Residence times were about 2.75 hours in the first reactor and about 2 hours in the second reactor. The production rate of polymer was about 32 kg/hr. The polymer was discharged from the reactors as a granular product having an MFR of about 2.0 dg/min. and ethylene level of about 0.8 wt %. Evaluation of the intermediate product from the first reactor showed a homopolypropylene with an MFR of 4.0.

The copolymer, Sample 2A, was prepared using the same catalyst system and polymerization procedure as described above for Sample 1. The only difference was a slight increase in the ethylene comonomer feed to the second reactor, resulting in an overall ethylene incorporation in the final product of about 1.0 wt %. The final granular product had an MFR of about 1.0; that of the intermediate product from the first reactor about 4.0. Both polymers, Samples 1 and 2A, comprise a reactor blend of a high(er) MFR homopolypropylene with a low MFR random copolymer.

The copolymer, Sample 2B, was prepared using a similar catalyst system and polymerization procedure as described above for Samples 1 and 2A, with some modifications. On catalyst, MS 952 silica (Davison Chemical, Division of W. R. Grace, Baltimore, Md.), previously dehydrated to 600° C. under $N_2$ was used instead of MS 948. Also, following the addition of the metallocene/alumoxane mixture to the silica, a solution containing Kemamine AS-990 (Witco Corporation, Greenwich, Conn.) in toluene (1 wt % of AS-990 based on weight of silica) was added to the slurry before drying. On reactor polymerization, the reactor levels were adjusted to provide a 70%/30% split between product made in the first and second reactors, versus a 55%/45% split during the production of Samples 1 and 2A.

The homopolymer, Sample 3, was also prepared using the two-metallocene mix described above. Several batches of the catalyst were combined to provide the charge for the polymerization run. The catalyst system was oil slurried (15 wt %) for ease of addition to the reactor.

The procedure for polymerizing Sample 3 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 13.5 g/hr. Triethylaluminum (TEAL) was employed as scavenger and fed at a rate of 2 ml/min. of a 2 wt % solution of TEAL in hexane solvent. Propylene was fed at a rate of about 65.8 kg/hr to the first reactor and about 27.2 kg/hr to the second reactor. Hydrogen was added for molecular weight control at 500 mppm in the first reactor and 900 mppm in the second reactor. Residence times were about 3 hours in the first reactor and about 2 hours in the second reactor. The production rate of polymer was about 25 kg/hr. The final polymer was discharged from the reactors as a granular homopolymer product having an MFR of 2.0 dg/min.

The homopolymer, Sample 4, was prepared using the metallocene catalyst system rac dimethylsilylbis(2-methyl-4-phenylindenyl)zirconium dichloride, activated with methylalumoxane and supported on silica. The catalyst system was prepared in the following manner.

A precursor solution was prepared by combining 343 g of 30 wt % methylalumoxane in toluene (Albemarle Corp., Baton Rouge, La.) representing 1.76 moles Al with 6.36 g of dimethylsilylbis(2-methyl-4-phenylindenyl)zirconium dichloride (0.01 moles Zr) by stirring. Then 367 g of toluene was added and stirring was continued for 15 minutes. The precursor solution (625.9 g) was added to 392 g of Davison MS 948 silica (1.6 cc/g pore volume—available from W. R. Grace, Davison Chemical Division, Baltimore, Md.) previously heated to 600° C. under $N_2$. The ratio of liquid volume to total silica pore volume was 1.10. The solid had the consistency of damp sand and was dried at reduced pressure (483+mm Hg vacuum) and temperatures as high as 50° C. over 16 hours. 485.5 g finely divided, free-flowing solid catalyst were obtained. Elemental analysis showed 0.09 wt % Zr and 7.37 wt % Al.

Several batches of catalyst system were combined to provide the charge for the polymerization run. The catalyst system was oil slurried (Drakeol™, 15 wt %) for ease of addition to the reactor. The procedure for polymerizing Sample 4 was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as a scavenger at a rate of 1.6 g/hr. The catalyst system prepared above was fed as a 15% slurry in mineral oil and was flushed into the reactor with propylene. Propylene monomer was fed to the first reactor at a rate of 73 kg/hr and to the second reactor at a rate of 27 kg/hr. Reactor residence time was about 2.3 hours in the first reactor and about 1.7 hours in the second reactor. Polymer production rates were about 16 kg/hr in the first reactor and 8 kg/hr in the second reactor. Polymer was discharged from the reactors as granular product having a MFR of 4.3 dg/min.

The copolymer, Sample 5, was prepared using the metallocene catalyst system rac-dimethylsilanediylbis(2-methyl-4,5-benzo-indenyl)zirconium dichloride, activated with methylalumoxane and supported on silica. The catalyst system was prepared in the following manner.

A precursor solution was prepared by combining 837.4 g of 30 wt % methylalumoxane in toluene (Albemarle Corp., Baton Rouge, La.) representing 4.31 moles Al with 8.45 g of dimethylsilanediylbis(2-methyl-4,5-benzo-indenyl) zirconium dichloride (0.015 moles Zr) by stirring. Then 249 g of toluene was added and stirring was continued for 15 minutes. The precursor solution was added to 783 g of Davison MS948 silica (1.6 cc/g pore volume—available from W. R. Grace, Davison Chemical Division, Baltimore, Md.) previously heated to 600° C. under $N_2$. The ratio of liquid volume to total silica pore volume was 0.95. The solid appeared dry and free flowing. The volatiles were removed by drying at reduced pressure (737+mm Hg vacuum) and temperatures as high as 65° C. over 24.5 hours. 1056 g finely divided, free-flowing solid catalyst were obtained. Elemental analysis showed 0.13 wt % Zr and 12.14 wt % Al.

Several batches of this catalyst system were combined to yield the charge required for the polymerization run. Prior to using for polymerization, 2 wt % Kemamine AS 990 (available from Witco Corp., Greenwich Conn.), was added to the catalyst dry solids. The catalyst was then oil slurried (Drakeol™, 15 wt %) for ease of addition to the reactor.

The procedure for polymerizing Sample 5 was as follows. The polymerization of propylene/ethylene copolymer was conducted in a pilot scale continuous, stirred tank, bulk liquid phase polymerization process employing two reactors in series. The reactors were equipped with jackets for removing the heat of polymerization. The reactor temperature was set at 55° C. in the first reactor and 51° C. in the second reactor. Catalyst was fed at rate of 9.2 g/hr. Triethylaluminum (TEAL) was employed as scavenger and fed at a rate of 2.25 ml/min. of a 2 wt % solution of TEAL in hexane solvent. Propylene was fed at a rate of about 99.8 kg/hr. Ethylene was used as a comonomer and its flow rate adjusted to provide an incorporation level of about 1.0 wt %. Residence times were about 3 hours in the first reactor and about 2.2 hours in the second reactor. The production rate of polymer was about 13.6 kg/hr. The polymer was discharged from the reactor as a granular product having an MFR of 3.9 dg/min. and a comonomer content of 1.1 wt % ethylene.

The molecular weight distributions of the metallocene-based polymers (Samples 1–5) are shown in FIG. 1. Samples 4 and 5 are derived from a single metallocene-based catalyst, while Samples 1, 2A, 2B and 3 are derived from a two metallocene-based catalyst. Samples 4 and 5 (homopolymer and ethylene copolymer respectively) show characteristically narrow molecular weight distributions, typical of single site metallocene catalyzed polymers. No differences in molecular weight distribution are observed between homopolymer Sample 4 and ethylene copolymer Sample 5. Of the two-metallocene catalyzed polymers, homopolymer Sample 3 shows a modestly broadened molecular weight distribution, reflecting contributions from the two individual metallocenes.

Surprisingly, the invention polymers, Samples 1, 2A and 2B show an unexpected bimodal molecular weight distribution. The incorporation of $\leq 1$ wt % ethylene comonomer during the polymerization process results in a substantial broadening of the molecular weight distribution at the high molecular weight end. This is unexpected since with both the individual metallocenes, molecular weight drops with ethylene addition.

Figure 2:
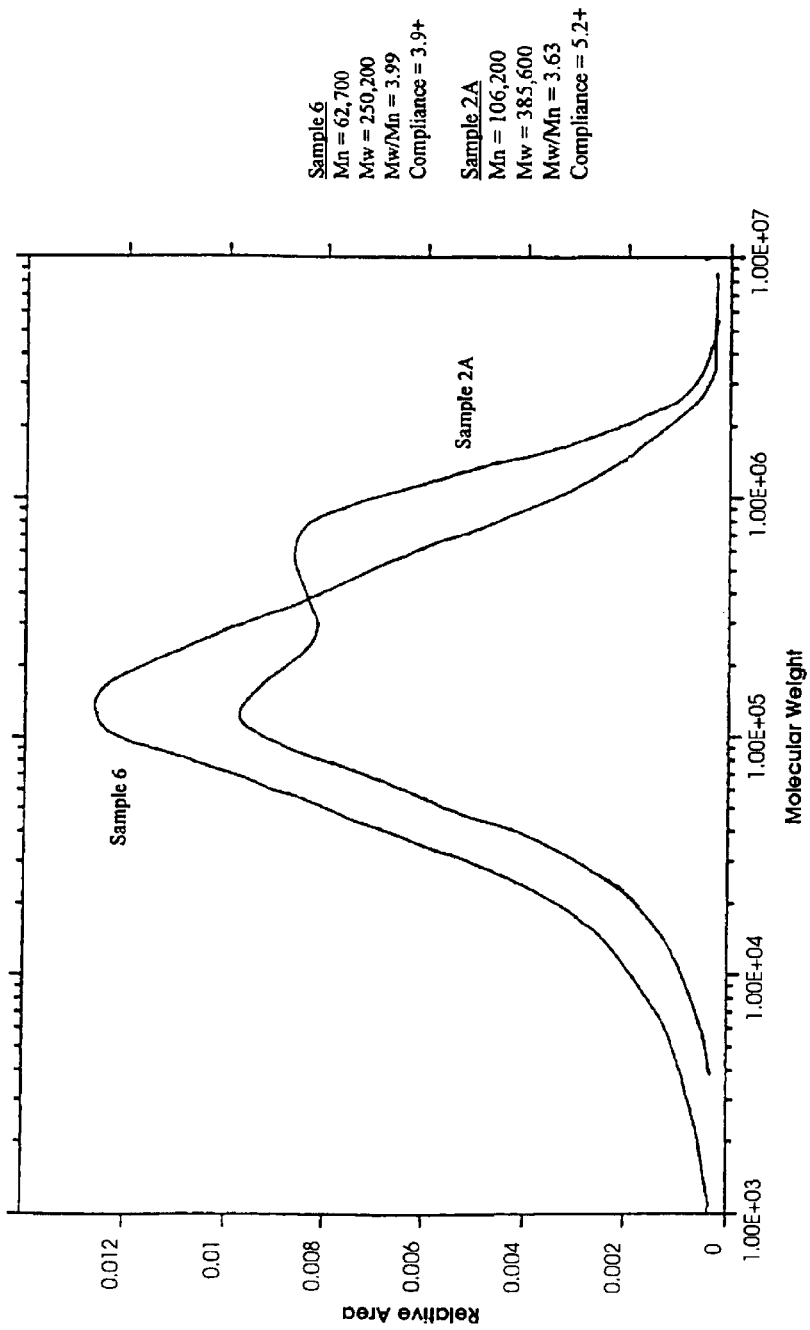
FIG. 2 represents GPC molecular weight distributions of comparative and inventive samples.

A comparison of the molecular weight distribution of an invention polymer (Sample 2A) versus one made by the same process (i.e., addition of ethylene comonomer in a separate polymerization stage) but using a conventional Ziegler-Natta catalyst (Sample 6) is shown in FIG. 2. The extent of molecular weight broadening to the high end for the invention polymer is clearly visible.

This substantial molecular weight broadening at the high molecular weight end for the invention polymers can be characterized by several techniques, one of which is the measurement of recoverable compliance (see FIGS. 1 and 2), the value of which is well known to track the high molecular weight end species of the distribution. The compliance values are observed to increase from $1.1 \times 10^4$ $Pa^{-1}$ for Sample 4 (single metallocene; homopolymer) to $3.6 \times 10^4$ $Pa^{-1}$ for Sample 3 (two metallocenes; homopolymer) to $\geq 3.9$ for invention polymers Samples 1, 2A, and 2B (two metallocenes; copolymer).

Figure 3:
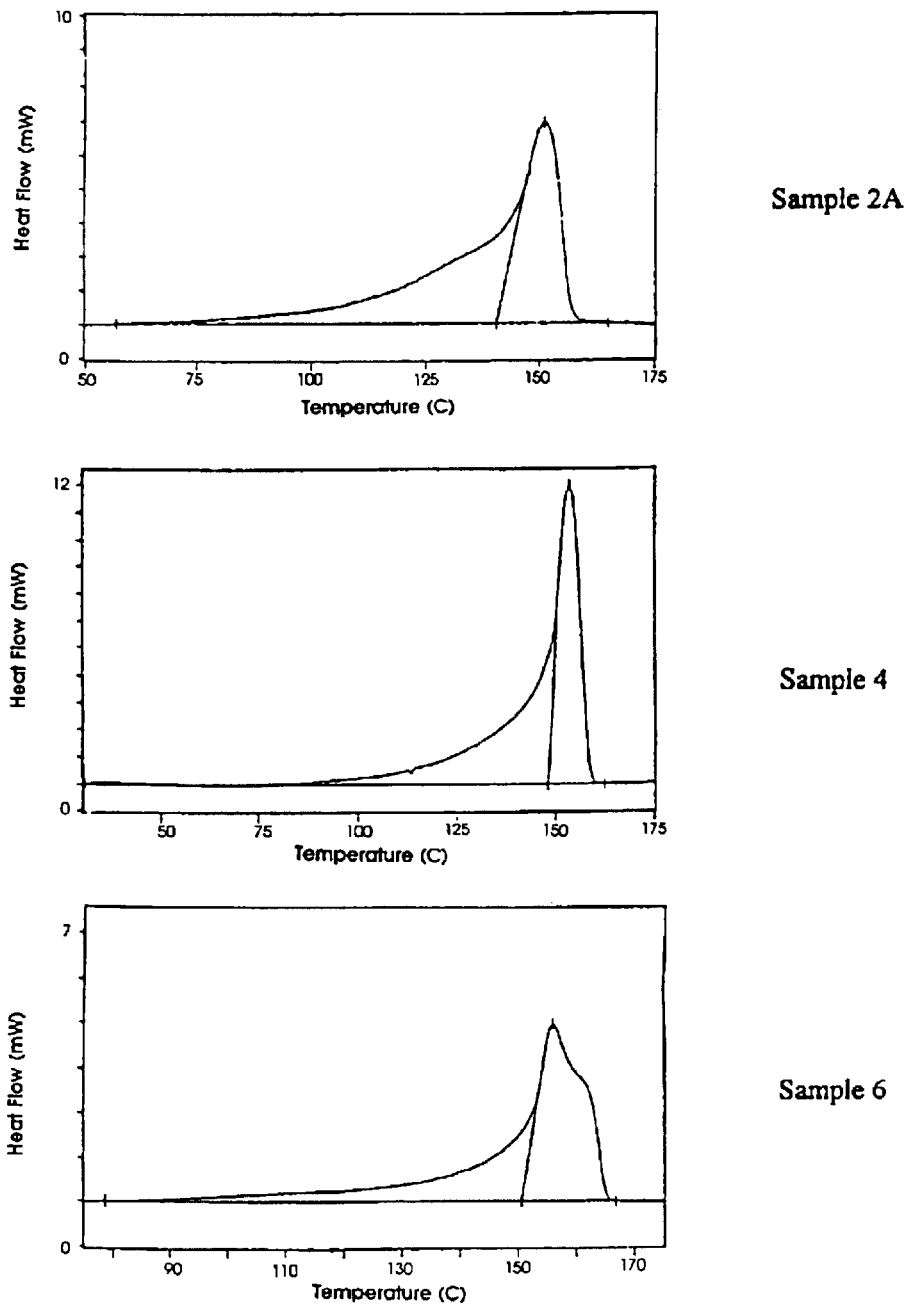
FIG. 3 represents DSC melting distributions of comparative and inventive samples.

The incorporation of ethylene in the invention polymers, believed to occur primarily in the larger molecules, broadens the melting distribution as is seen in the DSC melting data shown in FIG. 3 which compares invention polymer, Sample 2A, with metallocene control, Sample 4, and Ziegler-Natta control, Sample 6. Single site metallocene-based catalysts are known to provide uniform comonomer incorporation among all the molecules in a polymer sample and to allow greater melting point depression than conventional Ziegler-Natta based catalysts for the same comonomer incorporation level. Even with the greater level of ethylene incorporation in the invention polymers versus comparable Ziegler-Natta controls (0.8 and 1.0 wt % in Samples 1 and 2A versus 0.55 and 0.4 wt % in Samples 6 and 7), the extractables levels in the invention polymers are lower, reflecting their single site catalyzed origin (Table 1).

The invention polymers (Samples 1, 2A and 2B), two metallocene-catalyzed controls (Samples 3 and 4) and two Ziegler-Natta catalyzed controls (Samples 6 and 7) were converted to biaxially oriented films to assess ease of stretching and orientation. This step is recognized to be the critical point in the fabrication of such oriented films. One of the procedures adopted was one that is widely used in the art and involved cast extrusion of a sheet of polymer (typically 500 $\mu$m to 650 $\mu$m thick) followed by biaxial orientation at elevated temperature on a stretching apparatus such as a film stretcher from the T M Long Co., Somerville, N.J. (henceforth referred to as T M Long machine) to yield a final thickness of 15 $\mu$m to 25 $\mu$m. Ease of film stretching or orientation was judged from the uniformity of stretching (i.e., even stretch versus the presence of stretch bands), film sagging and in the most severe case, film breakage. A desired stretching profile is one that offers even stretching, without any stretch bands, breakage or sagging over a wide range of stretching temperatures. The stretching performance for the selected polymers are summarized in Table 2. The single metallocene catalyzed homopolymer Sample 4 shows poor stretchability. The two metallocene homopolymer, Sample 3, shows an improvement, though it is not as good as the invention polymers, Samples 1, 2A and 2B, which show a desirably broad stretching window. The performances of Samples 2A and 2B are seen to be superior to those of the Ziegler-Natta controls, Samples 6 and 7.

Graphical representations of the comparative processability ranges for the different samples are shown in FIG. 4. A curve having as wide a well as possible would be reflective of a polymer of good processing latitude. FIG. 4A compares the standard metallocene single site-based polymer Sample 4 versus the Ziegler-Natta control Sample 6. The lower melting, narrowly distributed polymer Sample 4 can be processed at lower temperature than control Sample 6, but it is seen to have poor processing latitude with stretching temperature. FIG. 4B compares the same Ziegler-Natta control Sample 6 against metallocene polymer, Sample 2A, the invention polymer. The processability range for Sample 2A is now seen to be quite a bit broader, particularly at low stretching temperatures, reflecting very favorable processing latitude.

Film property measurements on some of the biaxially stretched films produced above are shown in Table 3. The properties of the invention polymer films compare favorably with the Ziegler-Natta control. The Ziegler-Natta film has slightly higher film stiffness. It has been found that the stretching temperature for optimum film properties (low haze, maximum stiffness) for the invention polymers is lower than that used typically for the Ziegler-Natta control film. As seen in Table 3, the haze and modulus of the Sample 2A film are both improved on going from 154.4° C. stretching temperature to 143.3° C.

To attain such lower stretching temperatures with today's Ziegler-Natta polymers, one can use random copolymers of similar melting temperature to the invention polymers. This was done using Sample 8, a 2 MFR, 2.8 wt % ethylene random copolymer with Tm=146° C., the same as invention polymers Samples 1, 2A and 2B. Biaxially oriented film was prepared from Sample 8 by extruding cast sheet and stretching it at the lower temperature of 143.3° C. on the T M Long stretching apparatus. Film properties on stretched films of Sample 8 are compared versus those for Sample 2A in Table 4. The film properties profile displayed by the random copolymer Sample 8 is seen to be deficient to that of the invention polymer. Film stiffness, moisture barrier and tensile properties are all lower than those for the invention polymer. The film data demonstrate the unique balance of favorable film stretchability coupled with good film properties for the invention polymer.

Additional biaxial stretching measurements using an Instron machine (Model 1122) were conducted on a similar set of polymers previously analyzed via T. M. Long stretching. The key difference is the simultaneous biaxial stretching provided by the T. M. Long machine versus a sequential stretching provided by the Instron machine.

The stretching measurements on the Instron were conducted as follows: Cast extruded sheet (typically 600 μm thick) was cut along the machine direction (MD) into strips 76.2 mm wide. A strip was gripped between the jaws on the Instron. An appropriate length of strip was cut to allow a jaw separation of 25.4 mm. The sample was maintained in an environmental chamber on the Instron at a temperature of 110° C. The temperature thermocouple probe was positioned adjacent to the sample. The sample was stretched to 700% along the MD in the Instron at a temperature of 110° C. and a stretching rate of 50.8 mm/min. After the MD stretching, the sample was held at 700% extension while the chamber doors were opened and the sample allowed to cool down to ambient temperature. The sample (about 100 μm thick) was removed from the chamber and cut along the original transverse direction (TD) into 25.4 mm wide strips. A strip of appropriate length was again gripped between jaws on the Instron. Two different TD stretching conditions were used.

Case 1: 25.4 mm jaw separation, 1,100% TD stretching ratio, 508 mm/min. stretching speed, different stretching temperatures varying from 100° C. to 150° C. The strain rate for this stretching condition is about 2,200% per minute.

Case 2: 12.7 mm jaw separation, 2,200% TD stretching ratio, 1270 mm/min. stretching speed, different stretching temperatures varying from 120° C. to 160° C. The strain rate for this stretching condition is about 11,000% per minute.

Not all the samples were able to endure these TD stretching conditions and remain unbroken. Breaks were noted down in the data measurements when they occurred, along with the tensile strengths at 1,100% and 2,200% stretch ratios if unbroken. Two test specimens per polymer sample were evaluated at each stretching condition; values reported are averages for the two specimens.

TD stretching data per the testing conditions of Case 1 above are shown in Table 5. Table 5 shows the TD tensile strengths at 1,100% stretching ratio, and the break points for those samples that broke prior to achieving this stretching level. For all the samples, the propensity to break before reaching 1,100% TD stretching is greater at the lower temperatures. The superiority of the invention polymers is clearly seen in the data. They withstand breaking much better than either the metallocene controls (Samples 3 and 4) or the Ziegler-Natta controls (Samples 6 and 7). One has to go down to a stretching temperature of 110° C. (25° C. lower than the best of the control samples) before a break is noted in the invention polymer films. Also, when comparing samples at temperatures where breakage does not occur (see data at 150° C., for example), the invention polymer films (Samples 1 and 2A) show lower tensile strengths (i.e. easier stretchability) at 1,100% stretch ratio. Easier TD stretchability at lower stretching temperatures, without breaking, is one of the unique features offered by the invention polymers. Since film breaks during TD stretching are typically the weak link in biaxially oriented polypropylene film fabrication, via the tenter frame process, the invention polymers offer a significant processing advantage.

A typical commercial tenter frame process to make biaxially oriented polypropylene film, operating at 250 m/min. line speed and with TD stretch ratio 850% (i.e. 1 m wide film stretched to 8.5 m), has a TD-stretch strain rate of about 15,000% per minute. While it is difficult to match this value in a laboratory test, the Instron TD stretch test conditions of Case 2 above provide a strain rate of 11,000% per minute, which approaches that of the commercial fabrication process. Data measurements per Case 2 conditions are shown in Table 6. The results are the same as those noted earlier: Low TD tensile strength values and no film breaks for the invention polymers down to stretching temperatures 30° C. lower (130° C. versus 160° C.) than the best of the Ziegler-Natta control samples. At high TD strain rates, approaching those encountered during commercial tenter frame processing, the invention polymers display better low temperature TD stretchability without breaking.

Testing of the processability of the invention polymers during biaxially oriented film fabrication via the tenter frame process, was conducted on a pilot line capable of 1 m wide trimmed films. The preparation of such films is readily done using techniques well known in the art. Invention polymer Sample 2B was compared against Ziegler-Natta control Sample 9. Typical values set for some key processing parameters were:

|  | Sample 9 (2.1 MFR, 159° C. $T_m$) | Sample 2B (1.7 MFR, 147° C. $T_m$) |
| --- | --- | --- |
| Extrusion Melt Temperature | 274° C. | 269° C. |
| MD Oven Temperature | 135° C. | 122° C. |
| MD Stretching Ratio | 5.0 | 5.1 |
| TD Oven Temperature | 182° C. | 166° C. |
| TD Stretching Ratio | 7.7 | 7.7 |
| Film Thickness | 20 μm | 20 μm |

Figure 5:
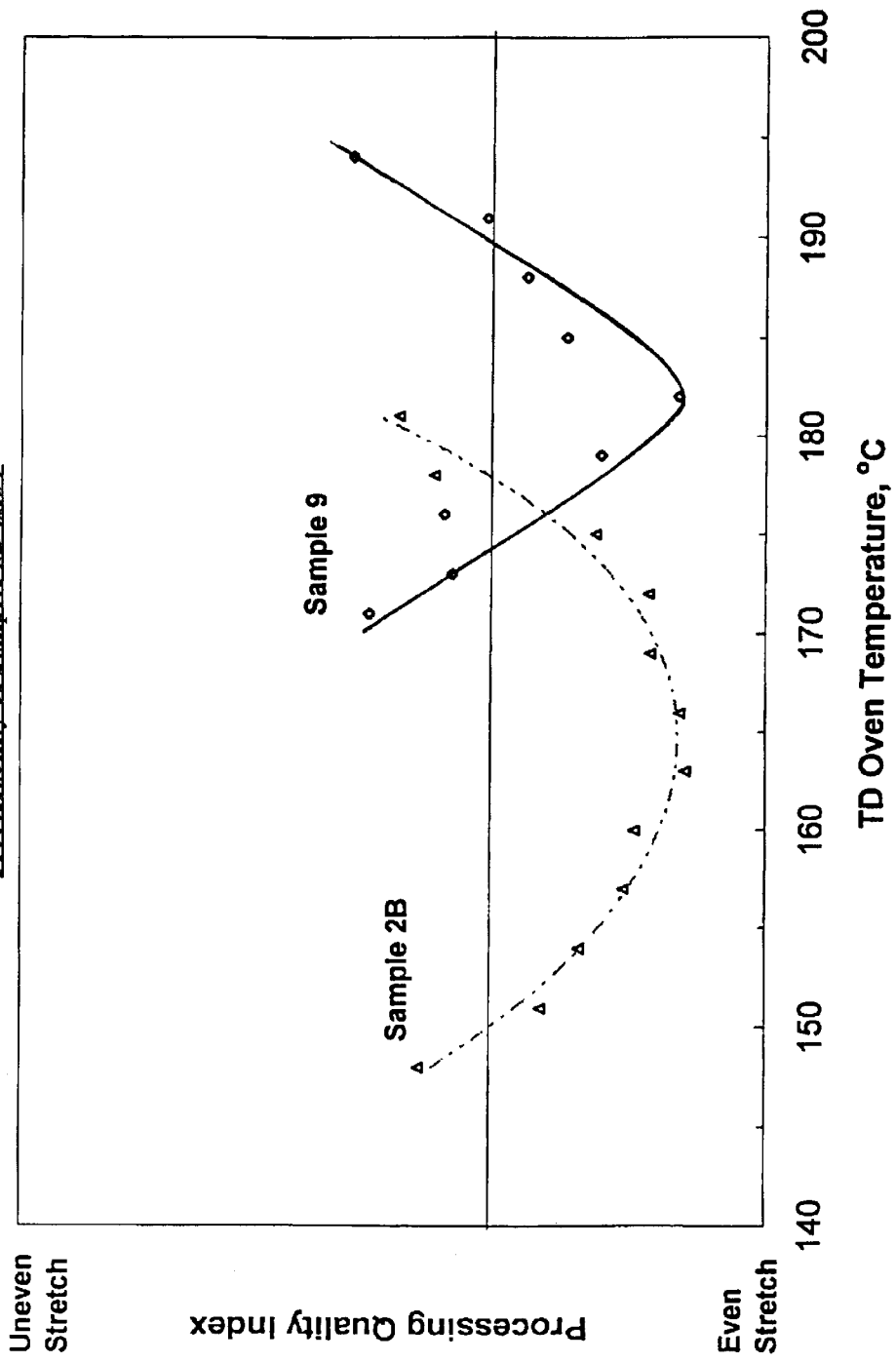
FIG. 5 represents a plot of processing windows during biaxial orientation of films for comparative and inventive examples.

A desirable processability range is the range of TD oven temperatures over which good film quality and uniformity are maintained. This was done because in the tenter OPP film process, TD stretching is usually the most critical step when stretch ratio, rate and contour are constant. At low TD oven temperature, the film is too strong to be stretched evenly and it breaks. At high TD oven temperature, the film is too soft and weak to withstand stretching; it tends to sag leading to poorly formed film or breakage. So there is a desirable temperature range (processability range) to achieve uniform and good quality film. A preferred resin provides a greater processability range. The data for Samples 9 and 2B are shown in FIG. 5. The processability range for the invention polymer, Sample 2B, is substantially broader than for the Ziegler-Natta control, Sample 9. For example, at a processing quality index that provides a processability range of 15° C. (174–189° C.) for Sample 9, the corresponding processability range for Sample 2B is 28° C. (150–178° C.). The invention polymer provides no only greater processing latitude, but also the capability to operate at significantly lower TD oven temperatures. This indicates advantages of lower energy input and higher line speed potential.

This superior stretching performance over a wide range of strain rates and temperature is a key attribute of the invention polymers. It translates to a broader biaxially oriented film processability range versus today's best Ziegler-Natta propylene polymers and versus single metallocene-catalyzed propylene polymers. This processing advantage is accompanied by a good profile of film properties.

Although the Examples in this invention deal primarily with films, it will be instantly recognized that the attributes of the invention polymers will lend themselves to use in other end-application areas as well. For example, in thermoforming and blow molding, the increased melt strength derived from the broadening of distribution to the high molecular weight end, coupled with the easier orientability at lower temperatures, should result in performance benefits versus single metallocene-catalyzed propylene polymers.

TABLE 1

Description of Samples*

| Sample | Catalyst | MFR | Comonomer (wt %) | Melting Temp. (C.) | Hexane Extractables (wt %) | TREF Extractables (wt %) |
|---|---|---|---|---|---|---|
| 1 | 2 MCN | 2.1 | $C_2$ (0.8) | 147.1 | 1.0 | 3.8 |
| 2A | 2 MCN | 1.0 | $C_2$ (1.0) | 146.5 | 0.9 | 3.9 |
| 2B | 2 MCN | 1.7 | $C_2$ (0.8) | 146.7 | — | 2.5 |
| 3 | 2 MCN | 2.0 | None | 151.0 | 0.7 | — |
| 4 | 1 MCN | 4.3 | None | 151.0 | 0.3 | — |
| 5 | 1 MCN | 3.9 | $C_2$ (1.1) | 139.0 | 0.4 | — |
| 6 | Z-N | 2.6 | $C_2$ (0.55) | 157.1 | 3.2 | 7.6 |
| 7 | Z-N | 3.4 | $C_2$ (0.4) | 156.3 | 3.1 | 5.9 |
| 8 | Z-N | 2.0 | $C_2$ (2.8) | 146.0 | 3.5 | — |
| 9 | Z-N | 2.1 | $C_2$ (0.6) | 158.5 | — | — |

*MFR was determined via the method of ASTM D 1238 Condition L. The melting temperature was determined from peak temperatures from DSC runs at 10° C./min. heating and cooling rates. Comonomer content was determined via FTIR measurements (calibrated versus $^{13}C$ NMR). Percent hexane extractables was determined via 21 CFR 177.1520(d)(3)(i) and (ii). Percent TREF extractables was determined during TREF (Temperature Rising Elution Fractionation) and represents an alternate method to quantify the generally low molecular weight, high comonomer-containing species that are prone to be migratory and extractable. In the TREF experiment (Exxon method; see Wild et al., Journal of Polymer Science, Polymer Physics Edition, vol. 20, 441, (1982); U.S. Pat. No. 5,008,204; and WO 93/03093) these species are the ones that do not crystallize at 0° C. but remain in the solvent at this temperature. While the absolute levels of hexane and TREF extractables will be different, the two methods provide similar trend data.

TABLE 2

Biaxially Oriented Film Processability*

| Stretching Temperature (° C.) | Sample 4 (Tm = 151° C.) | Sample 3 (Tm = 151° C.) | Sample 1 (Tm = 147.1° C.) | Sample 2A (Tm = 146.5° C.) | Sample 2B (Tm = 146.7° C.) | Sample 6 (Tm = 157.1° C.) | Sample 7 (Tm = 156.3° C.) |
|---|---|---|---|---|---|---|---|
| 140.6 | | | | B | U | | |
| 143.3 | B | U | B | E | U | | |
| 146.1 | | | B | E | E | | B |
| 148.9 | U | E | U | E | E | B | B |
| 151.7 | | | E | E | E | B | U |
| 154.4 | E | E | E | E | E | U | E |
| 157.2 | | | E | E | S | E | E |
| 160.0 | S | S | S | E | | E | E |
| 166.0 | | | | S | | S | |

*Samples stretched on TM Long stretching apparatus; MD × TD stretching ratio = 6 × 6; preheat time 27 sec; stretch rate 76.2 mm/sec; initial sheet thickness ~ 600 μm; final stretched film thickness ~ 20 μm
E = Even stretch, U = Uneven stretch (i.e., unstretched marks/unstretched regions), B = Break, S = Sagging

TABLE 3

Biaxially Oriented Film Properties*

| Film Property | Sample 4 | Sample 3 | Sample 1 | Sample 2A | Sample 2A+ | Sample 2B** | Sample 6 |
|---|---|---|---|---|---|---|---|
| Thickness, µm | 18 | 18 | 18 | 15 | 18 | 15 | 15 |
| Haze % | 1.0 | 0.9 | 0.9 | 1.0 | 0.3 | 0.3 | 0.3 |
| Gloss % | 92 | 94 | 92 | 91 | 94 | 94 | 94 |
| WVTR @ 37.8° C. & 100% RH, g/m$^2$/day per 25.4 µm | 5.7 | 5.9 | 6.5 | 7.1 | 6.7 | 6.9 | 6.5 |
| 1% Sec. Modulus, MPa (kpsi) | 2130 (309) | 2247 (326) | 2185 (317) | 2289 (332) | 2359 (342) | 2346 (340) | 2729 (396) |
| Ultimate Tensile Strength, MPa (kpsi) | 179 (26) | 193 (28) | 186 (27) | 200 (29) | 200 (29) | 209 (30) | 207 (30) |
| Ultimate Elongation, % | 61 | 70 | 62 | 65 | 65 | 75 | 71 |

*Films prepared on TM Long stretching apparatus; MD × TD stretching ratio = 6 × 6; preheat time 27 sec. Film thickness determined using a profilometer; Haze measured per ASTM D 1003; Gloss per ASTM D 2457; WVTR per ASTM F 372; Tensile properties and 1% secant modulus by ASTM D 882.
+Stretching temperature 143.3° C.; by comparison, Sample 2A data in column 5 is on film prepared at 154.4° C.
**Stretching temperature 146° C. for Sample 2B. Stretching temperature for the reamining Samples was 154° C.

TABLE 4

Biaxially Oriented Film Properties Comparison*

| Film Property | Sample 2A | Sample 8 |
|---|---|---|
| Thickness, µm | 18 | 18 |
| Haze, % | 0.3 | 0.2 |
| Gloss, % | 94 | 95 |
| WVTR @ 37.8° C. & 100% RH, g/m$^2$/day per 25.4 µm | 6.7 | 8.3 |
| 1% Sec. Modulus, MPa (kpsi) | 2359 (342) | 1851 (268) |
| Ultimate Tensile Strength, MPa (kpsi) | 200 (29) | 170 (25) |
| Ultimate Elongation, % | 65 | 72 |

*Films prepared on TM Long stretching apparatus at 143.3° C. stretching temperature; MD × TD stretching ratio = 6 × 6; preheat time 27 sec. Film thickness determined using a profilometer; Haze measured per ASTM D 1003, Gloss per ASTM D 2457, WVTR per ASTM F 372, Tensile properties and 1% secant modulus by ASTM D 882.

TABLE 5

Instron TD Tensile Strength (MPa) per Case 1 Stretching Conditions

| TD Stretching Temperature (° C.) | Sample 4 (Tm = 151° C.) | Sample 3 (Tm = 151° C.) | Sample 1 (Tm = 147.1° C.) | Sample 2A (Tm = 146.5° C.) | Sample 6 (Tm = 157.1° C.) | Sample 7 (Tm = 156.3° C.) |
|---|---|---|---|---|---|---|
| 100 | | | B | B (1,025%) | | |
| 110 | | | B (970%) | 9.8 | | |
| 120 | | | 8.2 | 7.5 | | |
| 130 | B | B | 6.6 | 7.4 | B | B |
| 135 | B | B | 6.3 | 6.4 | B | B (935%) |
| 140 | B | B (1,050%) | 4.5 | 5.3 | B | 6.0 |
| 145 | B | 6.3 | 3.2 | — | B (965%) | 5.0 |
| 150 | B (900%) | 5.1 | 3.1 | 3.7 | 5.1 | 4.8 |

Sequential Stretching on Instron
MD: 700%, 50.8 mm/min, 110° C., 25.4 mm jaw separation
TD: 1,100%, 508.0 mm/min, varying temperatures, 25.4 mm jaw separation, strain rate 2200%/min
B = Break prior to full 1,100% extension

TABLE 6

Instron TD Tensile Strength (MPa) per Case 2 Stretching Conditions

| TD Stretching Temp. (° C.) | Sample 1 ($T_m$ = 147.1° C.) | Sample 2A ($T_m$ = 146.5° C.) | Sample 6 ($T_m$ = 157.1° C.) | Sample 7 ($T_m$ = 156.3° C.) |
|---|---|---|---|---|
| 120 | B (1,365%) | B (2,100%) | B | B |
| 130 | 8.5 | 8.9 | B | B |
| 140 | 5.1 | 6.1 | B | B |
| 150 | 3.4 | 3.0 | B (1,965%) | B (1,765%) |
| 160 | — | — | 2.9 | 1.8 |

Sequential Stretching on Instron
MD: 700%, 50.8 mm/min., 110° C., 25.4 mm jaw separation
TD: 2,200%, 1,270 mm/min., varying temperatures, 12.7 mm jaw separation, strain rate 11,000%/min
B = Break prior to full 2,200% extension While the present invention has been described and illustrated by reference to particular embodiments, it will be appreciated by those of ordinary skill in the art that the invention lends itself to many different variations not illustrated herein. Additionally, all references, standard test methods, patents, applications, etc. are herein incorporated by reference in their entirety.

We claim:

1. A crystalline propylene polymer composition comprising:
   (a) from 10 to 90 weight percent of a crystalline propylene homopolymer composition comprising a first propylene homopolymer and a second propylene homopolymer; and
   (b) from 90 to 10 weight percent of a crystalline propylene copolymer composition comprising a first propylene copolymer and a second propylene copolymer, the first propylene copolymer and second propylene copolymer comprising from 0.05 to 15 weight percent of a comonomer based on the total weight of the crystalline propylene polymer composition;
   wherein the crystalline propylene polymer composition has a molecular weight distribution (Mw/Mn) in the range of from 2.1 to 10; and
   wherein the propylene homopolymer composition and the propylene copolymer composition are obtained in separate stages using a single metallocene catalyst system comprising two different metallocene catalyst components.

2. The composition of claim 1, wherein the comonomer weight percent is in the range of from 0.1 to 10.0.

3. The composition of claim 1, wherein the comonomer is selected from the group consisting of ethylene, 1-butene, 1-pentene, 1-hexene, and 1-octene.

4. The composition of claim 1, wherein the weight percent of the crystalline propylene homopolymer composition is from 20 to 80 weight percent.

5. The composition of claim 1, wherein the molecular weight distribution is from 2.5 to 7.0.

6. The composition of claim 1, wherein the hexane extractables level is less than 2.0 wt % as measured by 21 CFR 177.1520(d)(3)(ii).

7. The composition of claim 1, wherein the single metallocene catalyst system further comprises an alkyl alumoxane.

8. The composition of claim 1, wherein the single metallocene catalyst system further comprises an alkyl alumoxane and porous support material.

9. The composition of claim 1, wherein the two different metallocenes catalyst components are represented by the formula:

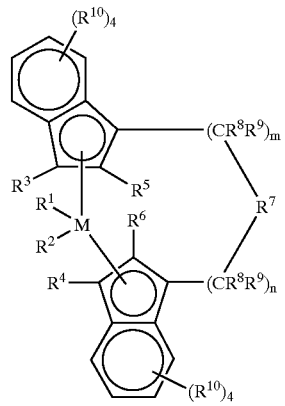

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which optionally is halogenated, a $C_6$–$C_{10}$ aryl group which optionally is halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

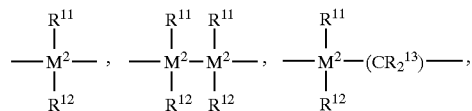

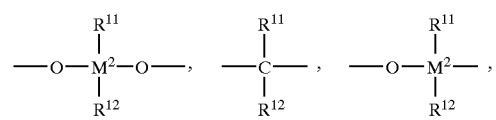

$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

R[8] and R[9] are identical or different and have the meanings stated for R[11];

m and n are identical or different and are zero, 1 or 2, m plus n being zero, 1 or 2; and the radicals R[10] are identical or different and have the meanings stated for R[11], R[12] and R[13] and two adjacent R[10] radicals can be joined together to form a ring system.

10. A crystalline propylene polymer composition comprising:
   (a) from 10 to 90 weight percent of a isotactic crystalline propylene homopolymer composition comprising a first propylene homopolymer and a second propylene homopolymer, the isotactic crystalline propylene homopolymer composition having a molecular weight distribution of less than 3.0; and
   (b) from 90 to 10 weight percent of a crystalline propylene copolymer composition comprising a first propylene copolymer and a second propylene copolymer, the first propylene copolymer and second propylene copolymer comprising from 0.05 to 15 weight percent of a comonomer based on the total weight of the crystalline propylene polymer composition, the crystalline propylene copolymer composition having a molecular weight distribution of less than 3.0;
   wherein the crystalline propylene polymer composition has a molecular weight distribution (Mw/Mn) in the range of from 2.1 to 10; and
   wherein the isotactic crystalline propylene homopolymer composition and crystalline propylene copolymer composition are obtained in separate stages using a single metallocene catalyst system comprising two different metallocene catalyst components.

11. A process for preparing a crystalline propylene polymer composition according to claim 1 comprising the steps of:
   (a) polymerizing propylene in a first stage;
   (b) copolymerizing propylene and a comonomer in a second stage; and
   (c) recovering the crystalline propylene polymer composition comprising from 0.05 to 15 weight percent of a comonomer (based on the total weight of the crystalline propylene polymer composition);
   wherein the steps (a) and (b) are conducted in the presence of a single metallocene catalyst system comprising two different metallocene catalyst components.

12. The process of claim 11, wherein the comonomer is selected from the group consisting of ethylene, 1-butene, 1-pentene, 1-hexene, and 1-octene.

13. The process of claim 11, wherein the crystalline propylene polymer composition comprises from 0.5 to 8 weight percent of the comonomer (based on the total weight of the crystalline propylene polymer composition).

14. The process of claim 11, wherein the crystalline propylene polymer composition comprises from 0.5 to 5 weight percent of the comonomer (based on the total weight of the crystalline propylene polymer composition).

15. The process of claim 11, wherein the two different metallocenes catalyst components are represented by the formula:

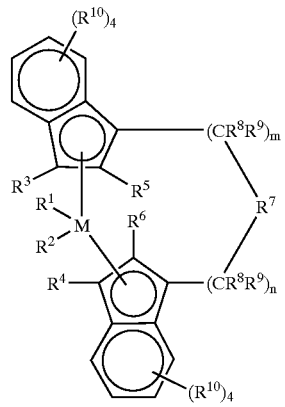

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

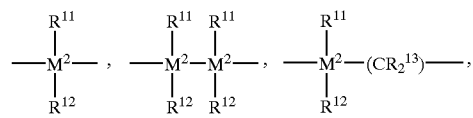

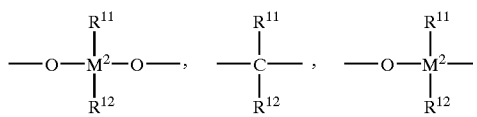

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaiyl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, in plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

16. The process of claim 11, wherein the single metallocene catalyst system further comprises an alkyl alumoxane activator and porous support material.

* * * * *